J. J. BRISTOW.
Pruning-Shears.
No. 158,240.
Patented Dec. 29, 1874.
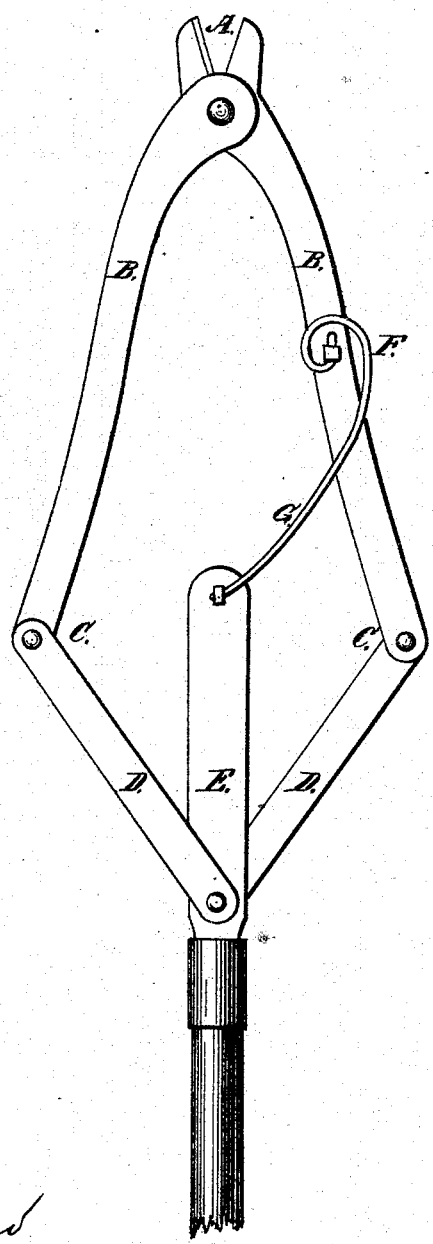
Witnesses.
W. L. Haydow
E. E. Waggoner,
Inventor:
J. J. Bristow

UNITED STATES PATENT OFFICE.

JOHN J. BRISTOW, OF WHITLEY'S POINT, ILLINOIS.

IMPROVEMENT IN PRUNING-SHEARS.

Specification forming part of Letters Patent No. 158,240, dated December 29, 1874; application filed March 8, 1873.

*To all whom it may concern:*

Be it known that I, JOHN J. BRISTOW, of Whitley's Point, in the county of Moultrie and State of Illinois, have invented certain Improvements in Pruning-Shears, of which the following is a specification:

My invention has relation to pruning-shears; and consists in the combination with a pair of shears, connected to an extension of the handle by levers pivoted at both ends, of a spring connecting said shears and handle-extension, so as to automatically separate the jaws after each cut, as hereinafter more fully described, in such a manner that the jaws will be automatically separated after severing a branch.

Figure 1 is a plan of my invention.

I construct a shears with a short cutting-edge, A, and long levers B B, with reverse motion; or, to be better understood, so that when the levers B B are separated the cutting-edges A are brought together, and the reverse. To the ends of the levers B B, at C C, I join short levers D D. I construct a ferrule for a handle, with an extension, E, of sufficient length to unite the two levers D D with it, at or near the ferrule, with a bolt, so as to admit of lateral motion; and the other end of the extension is united with lever B, at F, by a spring, G, in such a manner that, when the force which is applied to the handle, which is inserted at the ferrule, to perform the cutting, is relaxed, the spring will draw the levers together and separate the cutting-edges.

The operation is as follows: A handle is attached to the shears of sufficient length, the cutting-edges of the shears are placed against the limb or branch to be cut, and force is applied by pushing, which acts on the short levers D D, which separates the long levers B B, and performs the cutting by bringing the edges together.

The object of the spring G is to bring the levers B B together and separate the cutting-edges, preparing it for the next operation.

I claim—

The combination, with the shears A B B, levers D D, and handle-extension E, of the spring G, connecting said shears and extension, as shown, so as to automatically separate the jaws after each cut, substantially as described.

JOHN J. BRISTOW.

Witnesses:
W. L. HAYDON,
E. E. WAGGONER.